US008847419B2

(12) United States Patent
Bertolotti et al.

(10) Patent No.: US 8,847,419 B2
(45) Date of Patent: Sep. 30, 2014

(54) CONTROL DEVICE FOR A WIND TURBINE

(75) Inventors: Fabio Bertolotti, Bad Bentheim (DE); Jens Van Schelve, Schüttorf (DE)

(73) Assignee: SSB Wind Systems GmbH & Co. KG, Salzbergen (DE)

( * ) Notice: Subject to any disclaimer, the term of this patent is extended or adjusted under 35 U.S.C. 154(b) by 107 days.

(21) Appl. No.: 13/637,902

(22) PCT Filed: Feb. 9, 2011

(86) PCT No.: PCT/EP2011/051905
§ 371 (c)(1),
(2), (4) Date: Sep. 27, 2012

(87) PCT Pub. No.: WO2011/120729
PCT Pub. Date: Oct. 6, 2011

(65) Prior Publication Data
US 2013/0015662 A1 Jan. 17, 2013

(30) Foreign Application Priority Data

Apr. 1, 2010 (DE) .......................... 10 2010 016 292

(51) Int. Cl.
*F03D 9/00* (2006.01)
*H02P 9/04* (2006.01)
*F03D 7/04* (2006.01)
*F03D 11/00* (2006.01)
*F03D 7/02* (2006.01)

(52) U.S. Cl.
CPC ............ *F03D 11/0091* (2013.01); *F03D 7/043* (2013.01); *F05B 2270/321* (2013.01); *Y02E 10/723* (2013.01); *F03D 7/028* (2013.01); *F05B 2270/325* (2013.01); *F05B 2270/32* (2013.01); *Y02E 10/722* (2013.01); *F05B 2270/335* (2013.01); *Y02E 10/721* (2013.01); *F05B 2270/327* (2013.01); *F05B 2260/821* (2013.01); *F05B 2270/324* (2013.01)
USPC ......................................................... 290/44

(58) Field of Classification Search
CPC ..... F03D 7/028; F03D 11/0091; F03D 7/043; F05B 2260/821; F05B 2270/321; F05B 2270/325; F05B 2270/335; F05B 2270/32; F05B 2270/324; F05B 2270/327; Y02E 10/721; Y02E 10/723; Y02E 10/722; H02P 9/04
USPC .......................................... 290/44, 43, 54, 55
See application file for complete search history.

(56) References Cited

U.S. PATENT DOCUMENTS 6,320,272 B1   11/2001 Lading et al.
6,809,431 B1   10/2004 Schippmann
(Continued)

FOREIGN PATENT DOCUMENTS

DE          198 44 258 A1    3/2000
DE      10 2006 041461 A1    3/2008
(Continued)

OTHER PUBLICATIONS

English Translation of the International Preliminary Report on Patentability (Chapter I of the Patent Cooperation Treaty) for PCT/EP2011/051905, issued Oct. 2, 2012.
(Continued)

*Primary Examiner* — Javaid Nasri
(74) *Attorney, Agent, or Firm* — Harness, Dickey & Pierce, P.L.C.

(57) ABSTRACT

The invention relates to a control device for a wind power plant having an electrical system and a rotor including a plurality of rotor blades driven by wind, and outputting a mechanical rotor power to the electrical system. The system converts the mechanical rotor power at least partially into electrical power. The control device includes a blade sensor associated with at least one of the rotor blades and measuring at least one physical property of the rotor blade dependent on at least one characteristic value of a wind field describing the wind at the location of the rotor. The blade sensor generates a blade sensor signal characterizing the physical property. The control device also includes an estimation unit to determine an estimated value for the electrical power as a function of the blade sensor signal.

15 Claims, 9 Drawing Sheets

(56) References Cited

U.S. PATENT DOCUMENTS

2006/0002791 A1* 1/2006 Moroz ............................ 416/1
2010/0052321 A1 3/2010 Bilges et al.
2012/0211986 A1* 8/2012 Bertolotti et al. ............... 290/44

FOREIGN PATENT DOCUMENTS

| DE | 10 2007 058054 A1 | | 6/2009 |
|---|---|---|---|
| EP | 1 744 058 A1 | | 1/2007 |
| EP | 2 017 468 | * | 1/2009 |
| EP | 2 154 362 A1 | | 2/2010 |
| EP | 2 159 418 A2 | | 3/2010 |
| EP | 2 317 327 A1 | | 5/2011 |
| GB | 2 067 247 A | | 7/1981 |
| WO | WO-2009/153614 A2 | | 12/2009 |

OTHER PUBLICATIONS

International Search Report (in German with English translation) and Written Opinion (in German) for PCT/EP2011/051905, mailed Jan. 20, 2012; ISA/EP.

* cited by examiner

CONTROL DEVICE FOR A WIND TURBINE

CROSS-REFERENCE TO RELATED APPLICATIONS

This application is a 371 U.S. National Stage of International Application No. PCT/EP2011/051905, filed Feb. 9, 2011, and claims priority to German Patent Application No. 10 2010 016 292.2, filed Apr. 1, 2010, the disclosures of which are herein incorporated by reference in their entirety.

FIELD

The invention relates to a control device for a wind turbine having an electrical system and a rotor which comprises a plurality of rotor blades and which is driven by wind and which transmits a mechanical rotor power to the electrical system, which converts this at least partially into an electrical power, having a blade sensor means which is associated with at least one of the rotor blades and which measures at least one physical property of the at least one rotor blade dependent on at least one characteristic variable of a wind field describing the wind at the location of the rotor and which provides at least one blade sensor signal which characterises that at least one property. The invention further relates to a method for controlling the operation of a wind turbine.

BACKGROUND

European Patent Application No. 09013565.8 discloses a system which is provided for use in a wind turbine which comprises a rotor having two or more blades in order to measure a wind speed field, at least one sensor signal being obtained by measuring at least at one of the rotor blades a physical property which is characteristic of at least one characteristic variable of the wind speed field. There is produced for a plurality of wind conditions a table which places the at least one sensor signal in relation to values for the at least one characteristic variable of the wind speed field. A value for the at least one characteristic variable of the wind speed field is established from the table by means of a search unit on the basis of values which are given for a current wind condition and which characterise the at least one sensor signal.

The electrical power produced by a wind turbine is of great interest and financial significance both for the wind turbine manufacturer and for the wind turbine operator. The power produced momentarily by a wind turbine depends, on the one hand, on the state of the mechanical equipment components, including the rotor blades, the drive train, the electrical components and the control of those equipment components and, on the other hand, characteristic variables of the wind, such as the wind strength, the wind direction relative to the rotor orientation and the horizontal and vertical wind shear, in the region of the surface-area covered by the rotor. These characteristic variables are specific to the location of the wind turbine and depend both on the geographical location thereof and on atmospheric conditions. Furthermore, if a plurality of wind turbines are positioned close together in a wind park, a wind turbine may further influence the electrical power production of another wind turbine owing to the wind shadow thereof.

The expected electrical power which generally forms part of the contractual obligations between the manufacturer and operator is generally defined by general conditions which are set out by the manufacturer, such as, for example, the operation of the wind turbine on level ground with constant wind. Disputes may arise between the parties if the power actually produced does not correspond to the expected power. Consequently, there is a need both for the manufacturer and for the operator for a method which allows precise and reliable estimation of the operating state of the wind turbine in order to be able to check whether the actual power of the wind turbine corresponds to the specifications of the manufacturer.

A precise estimation of the electrical power currently produced by the wind turbine over the service-life thereof would further afford the advantage to the operator of identifying problems in mechanical equipment components of the wind turbine by comparison of the estimated value for the electrical power with the measured value for the electrical power if the estimated value and the measured value deviate from each other by more than a predetermined amount (the estimated value for the electrical power may also be referred to as expected electrical power).

Currently, it is not possible to establish an estimated value for the electrical power at a specific location either momentarily or over a period of time with a sufficient level of accuracy because the characteristic variables of the wind in the surface-area covered by the rotor are not known. The measurement devices arranged at the upper end of the gondola, such as an anemometer and wind vane, are too imprecise because they only measure the wind at a single spatial point and not in the surface-area covered by the rotor. Distortions in the wind field further occur owing to the gondola and turbulence generated by each blade, whereby precise measurement is prevented.

Wind data of greater quality can be provided by a meteorological mast. The spacing between the mast and the wind turbine results in unknown deviations of the wind speed at the location of the rotor, however, whereby the calculation of an accurate estimated value for the electrical power is prevented. This aspect becomes even more problematic if only a single mast or a small number of masts is/are used for a large wind park which may comprise up to several hundred wind turbines which are arranged so as to be distributed over a large area. Although a reduction in the spacing between the masts and the wind turbines by using a large number of masts would reduce the problem, the expenditure necessary for this would be too great and too cost-intensive. Another disadvantage is that each mast can measure the wind shear only in the vertical direction so that the horizontal wind shear remains unknown.

Although optical systems mounted on the gondola such as, for example, LIDAR systems (LIDAR=light detection and ranging) can measure through the rotor plane into the incoming wind field, the measurement takes place only along a laser beam so that the detectable range from the measurement position is limited to a cone whose interface with the surface-area covered by the rotor is only a portion thereof. Consequently, the characteristic variables of the wind can be measured only in an inadequate manner over the surface-area covered by the rotor.

Therefore, it is desirable to provide a system and/or method which is preferably available at any time for establishing a precise estimated value for the electrical power of a wind turbine.

SUMMARY

Consequently, an object of the invention is to be able to form as precise an estimated value as possible for the electrical power of a wind turbine. The system and/or method should preferably also enable a comparison between the estimated value and the actual electrical power of the wind turbine.

This object is achieved according to the invention with a control device and with a method according to the independent claims. Preferred developments of the invention are set out in the dependent claims.

The control device according to the invention for a wind turbine having an electrical system and a rotor which comprises a plurality of rotor blades and which is driven by wind and which transmits a mechanical rotor power to the electrical system, which converts this at least partially into an electrical power, comprises
- a blade sensor means which is associated with at least one of the rotor blades and which measures at least one physical property of the at least one rotor blade dependent on at least one characteristic variable of a wind field describing the wind at the location of the rotor and which provides at least one blade sensor signal which characterises that at least one property and
- an estimation unit which establishes an estimated value for the electrical power using the at least one blade sensor signal.

Since the at least one physical property of the rotor blade is dependent on the at least one characteristic variable of the wind field, the estimated value for the electrical rotor power is established on the basis of information which originates directly from the surface-area covered by the rotor. Consequently, inaccuracies owing to a spacing between the surface-area covered and the location of the measurement can no longer occur. Furthermore, the rotor blade travels round in the surface-area covered by the rotor so that a plurality of pieces of information regarding the wind field at the location of the surface-area covered are available. As a result, the estimated value for the electrical power is relatively precise.

One or more properties of the wind turbine are preferably also taken into consideration in order to establish the estimated value for the electrical power. However, since those properties are known, consideration thereof is not difficult. Such properties may include, for example, the aerodynamic and/or mechanical properties of the rotor and/or the at least one rotor blade, the position of the sensor means, the mechanical and/or dynamic properties of the drive train and/or the electrical properties of the electrical system.

The wind field describes properties of the wind at the location of the rotor, in particular in or in the region of the surface-area covered by the rotor. The properties of the wind particularly include the wind speed, the wind direction, the horizontal wind shear and the vertical wind shear. The at least one characteristic variable of the wind field characterises at least one of the properties of the wind, in particular in the form of a spatial mean value which is formed on the basis of values for the at least one property of the wind at different locations in or in the region of the surface-area covered by the rotor. The at least one characteristic variable of the wind field preferably characterises the wind speed and/or the wind direction and/or the horizontal wind shear and/or the vertical wind shear. The wind field is or comprises, for example, a wind speed field.

According to a development of the invention, the estimation unit comprises a wind field estimator which establishes an estimated value for the mechanical rotor power using the at least one blade sensor signal and a power estimator which establishes the estimated value for the electrical power on the basis of the estimated value for the mechanical rotor power. The wind field estimator preferably establishes at least one value which characterises the at least one characteristic variable of the wind field using the at least one blade sensor signal and the estimated value for the mechanical rotor power which is preferably established on the basis of the at least one value which characterises the at least one characteristic variable of the wind field. According to one construction of the invention, the at least one value which characterises the at least one characteristic variable of the wind field is at least one estimated value which characterises the at least one characteristic variable of the wind field.

The above-described method divides the establishment of the estimated value for the electrical power particularly into a plurality of steps. In a first of the steps, the estimated value for the mechanical rotor power is preferably established and, in a second of the steps, the estimated value for the electrical power is preferably established on the basis of that estimated value. This has been found to be advantageous owing to the complexity of the establishment of the estimated value for the electrical power. Since, in the first step, in particular the conversion of the wind power into the mechanical rotor power and, in the second step, in particular the conversion of the mechanical rotor power into the electrical power is considered, suitable model formations can be used for the steps, respectively. In the first step, the at least one value which characterises the at least one characteristic variable of the wind field is preferably established using the at least one blade sensor signal and/or the at least one measured physical property of the at least one rotor blade. This is advantageous because that at least one value describes the wind at the location of the rotor and the mechanical rotor power is dependent on the wind at the location of the rotor. Consequently, the first step is preferably divided into a plurality of part-steps. In a first of the part-steps, the wind at the location of the rotor is preferably described and, in a second of the part-steps, the mechanical rotor power is preferably established in accordance with the wind at the location of the rotor.

In the first part-step, the at least one value which characterises the at least one characteristic variable of the wind field is preferably established using the at least one blade sensor signal and/or the at least one measured physical property of the at least one rotor blade and, in the second part-step, the mechanical rotor power is preferably established, in particular in accordance with that at least one value. Consequently, suitable model formations can be used for the part-steps. The method described here is not intended to be understood to be limiting, however, so that the establishment of the estimated value for the electrical power may also take place in a different manner.

The at least one value which characterises the at least one characteristic variable of the wind field preferably characterises the wind speed and/or the wind direction and/or the horizontal wind shear and/or the vertical wind shear, in particular at the location of the surface-area covered by the rotor. Preferably, at least one value or estimated value for the at least one characteristic variable of the wind field can be derived from the at least one value which characterises the at least one characteristic variable of the wind field. The at least one value which characterises the at least one characteristic variable of the wind field preferably forms at least one value or estimated value for the at least one characteristic variable of the wind field.

The wind field estimator calculates the at least one value which characterises the at least one characteristic variable of the wind field and/or the estimated value for the mechanical rotor power, for example, using one or at least one method for system identification. According to a construction of the invention, the wind field estimator establishes the at least one value which characterises the at least one characteristic variable of the wind field and/or the estimated value for the mechanical rotor power using a or at least one MBC transformation (Multi-Blade-Coordinate Transformation). For example, the at least one MBC transformation may comprise a 1p MBC transformation or a 1p MBC transformation and a 2p MBC transformation.

The estimation unit preferably comprises one or at least one wind field table, in which values which characterise the at least one characteristic variable of the wind field and values for estimating the mechanical rotor power are stored for different wind conditions, the values for estimating the mechanical rotor power particularly being in relation to the values which characterise the at least one characteristic variable of the wind field. The wind field estimator establishes the estimated value for the mechanical rotor power, preferably using the wind field table. In particular, the wind field estimator establishes a value which is stored in the wind field table in order to estimate the mechanical rotor power (at least) in accordance with the at least one blade sensor signal or a value or set of values derived therefrom. On the basis of the value established from the wind field table for estimating the mechanical rotor power, the wind field estimator forms the estimated value for the mechanical rotor power. The value established from the wind field table preferably already corresponds to the estimated value for the mechanical rotor power. The establishment of the value for estimating the mechanical rotor power from the wind field table is preferably carried out by means of a search unit which is included, for example, by the wind field estimator. The wind field table is particularly stored or saved in the wind field estimator. The values stored in the wind field table may be calculated, for example, by model formation and/or established by tests. In particular, the wind field table is produced in advance and is consequently predetermined so that it can be used by the wind field estimator.

The blade sensor means measures the at least one physical property particularly several times in succession, preferably continuously. The wind field estimator preferably successively establishes a plurality of values for estimating the mechanical rotor power and forms, with time averaging or by time averaging of those values, the estimated value for the mechanical rotor power which consequently represents a mean time value for the estimated mechanical rotor power. The averaging is preferably carried out over a preselected time period. The estimated value for the mechanical rotor power preferably forms a continuous mean value.

The power estimator calculates the estimated value for the electrical power, for example, using a or at least one method for system identification. The estimation unit preferably comprises a power table, in which operating values and power values dependent on the mechanical rotor power are stored for different operating conditions of the wind turbine in order to estimate the electrical power, the power values for estimating the electrical power preferably being in relation to the operating values dependent on the mechanical rotor power. The power estimator establishes the estimated value for the electrical power, preferably using the power table. In particular, the power estimator establishes a value stored in the power table in order to estimate the electrical power (at least) in accordance with the estimated value for the mechanical rotor power. On the basis of the value established from the power table for estimating the electrical power, the power estimator forms the estimated value for the electrical power. The value established from the power table preferably already corresponds to the estimated value for the electrical power. The power table is particularly stored or saved in the power estimator. The values stored in the power table may, for example, be calculated by model formation and/or established by tests. In particular, the power table is produced in advance and is consequently predetermined so that it can be used by the power estimator.

The operating values dependent on the mechanical rotor power preferably include at least values for the mechanical rotor power. However, those operating values may further also include values for the rotor speed and/or values for the rotor acceleration and/or values for the ambient temperature and/or desired values for the electrical power and/or other values. Preferably, the values stored in the power table characterise stationary operating states of the wind turbine in which the rotor speed is constant or substantially constant, respectively. However, the rotor speeds may differ from each other in different stationary operating states.

Additionally or alternatively, it is possible for the values or some of the values stored in the power table to characterise at least one acceleration state and/or at least one deceleration state of the wind turbine, the rotor speed increasing in the acceleration state and decreasing in the deceleration state.

According to a development of the invention, the power estimator further establishes the estimated value for the electrical power on the basis of the at least one value which characterises the at least one characteristic variable of the wind field. This may be advantageous, for example, because the electrical system is preferably controlled or regulated in accordance with the wind conditions. Consequently, the wind conditions can influence the conversion of the mechanical rotor power into the electrical power.

The electrical power is preferably controlled in accordance with at least one desired value for the electrical power, in particular by means of a control unit. There is preferably provided a notification unit which can request the at least one desired value for the electrical power and can provide it for the estimation unit and/or the power estimator. The notification unit preferably requests the at least one desired value from the control unit. In particular, the at least one desired value includes a desired value for the effective electrical power and/or a desired value for the reactive electrical power. The estimation unit and/or the power estimator preferably further establishes the estimated value for the electrical power on the basis of the at least one desired value for the electrical power. This is advantageous, for example, because the conversion of the mechanical rotor power into the electrical power is preferably influenced by the at least one desired value. The control unit in which in particular the at least one desired value is stored is preferably formed by the main control system (general system control) of the wind turbine or by a portion of that control system.

According to a construction of the invention, there is provided an air sensor means which measures at least one physical property of the air at the location of the wind turbine and which provides at least one air sensor signal which characterises that at least one physical property of the air. The physical property of the air is preferably measured at the location of the rotor. In particular, the wind field estimator establishes the at least one value which characterises the at least one characteristic variable of the wind field and/or the estimated value for the mechanical rotor power additionally using the at least one air sensor signal so that the values can be improved with regard to their accuracy. The air sensor means preferably has an air density sensor which measures the air density and/or a temperature sensor which measures the air temperature so that the at least one physical property of the air comprises the air density and/or the air temperature.

According to a construction of the invention, there is provided a rotor sensor means, via which at least one physical property of the rotor is measured and at least one rotor sensor signal which characterises that at least one property of the rotor is provided. The at least one physical property of the rotor preferably comprises the rotor angle and/or the rotation speed of the rotor (rotor speed) and/or the blade angle of the at least one rotor blade and/or the rotor acceleration.

The operating state of the wind turbine is preferably characterised by at least one operating state variable which comprises the at least one physical property of the air and/or the at least one physical property of the rotor. The at least one operating state variable is preferably measured via the air sensor means and/or the rotor sensor means. Preferably, the at least one operating state variable is characterised by at least one operating state variable signal which particularly comprises the at least one air sensor signal and/or the at least one rotor sensor signal.

According to a development of the invention, values for the at least one operating state variable are further stored in the wind field table for different operating states of the wind turbine, the values for estimating the mechanical rotor power preferably further being in relation to the values for the at least one operating state variable. In particular, the wind field estimator establishes a value stored in the wind field table in order to estimate the mechanical rotor power using the at least one blade sensor signal and the at least one operating state variable signal. The value for estimating the mechanical rotor power is preferably established by means of the search unit.

The blade sensor means is preferably arranged on the rotor. In particular, the blade sensor means is arranged on the at least one rotor blade and/or on a rotor hub of the rotor, to which the rotor blades are connected.

The at least one physical property of the at least one rotor blade is or comprises preferably at least one mechanical property of the at least one rotor blade. In particular, that at least one property is or comprises at least one deformation of the at least one rotor blade, which deformation is preferably a or at least one resilient deformation.

According to a development of the invention, the blade sensor means comprises at least one expansion sensor which measures an expansion of the at least one rotor blade and/or at least one torsion sensor which measures a torsion of the at least one rotor blade and/or at least one flexion sensor which measures a flexion of the at least one rotor blade. In particular, the expansion sensor and/or the torsion sensor and/or the flexion sensor are each arranged at least at one predetermined position of the at least one rotor blade or the rotor hub. The at least one physical property of the at least one rotor blade consequently comprises an expansion and/or a torsion and/or a flexion of the at least one rotor blade, in particular at the or the at least one predetermined position(s).

According to a construction of the invention, there is provided a measuring means for electrical power, via which a current value of the electrical power is measured. Consequently, both the estimated value for the electrical power and the current value of the electrical power can be provided for the purposes of evaluation. In particular, there is provided a data acquisition system which receives the estimated value for the electrical power and the current value of the electrical power. Those values are preferably collected by the data acquisition system and/or at least temporarily stored therein. The data acquisition system preferably calculates the difference between and/or the quotient from the estimated value for the electrical power and the current value of the electrical power. However, the calculation of that difference and/or that quotient can also be carried out at a different location or externally. The data acquisition system may, for example, also be referred to as a data acquisition unit.

According to a development of the invention, there is provided a measuring means for mechanical power, via which a current value of the mechanical rotor power is measured. Consequently, both the estimated value for the mechanical rotor power and the current value of the mechanical rotor power may be provided for the purposes of evaluation. In particular, the current value of the mechanical rotor power and the estimated value for the mechanical rotor power are received by the data acquisition system. Those values are preferably collected by the data acquisition system and/or at least temporarily stored therein. The data acquisition system preferably calculates the difference between and/or the quotient from the estimated value for the mechanical rotor power and the current value of the mechanical rotor power. However, the calculation of that difference and/or that quotient can also be carried out at a different location or externally. The measuring means for mechanical power and the measuring means for electrical power may also be combined in one measuring means.

The data acquisition system is preferably connected to the main control system of the wind turbine. In particular, the data acquisition system is formed by the main control system or by a portion thereof. According to a development of the invention, there is provided a SCADA system (SCADA=Supervisory Control and Data Acquisition), by means of which in particular information characterising the operating state of the wind turbine can be transmitted to one or more data-processing systems which are preferably provided externally with respect to the wind turbine. The data-processing system(s) is/are preferably connected to the wind turbine, in particular to the SCADA system and/or the main control system. The SCADA system is preferably formed by the main control system or by a portion thereof. The data acquisition system is preferably connected to the SCADA system or included thereby. Consequently, the data acquisition system may also be referred to as a SCADA unit. According to a development of the invention, the SCADA system comprises a central processing unit which is connected to an interface of the wind turbine, a meteorological measuring system and/or a network transfer device, for example, via a local network. The control device and/or the estimation unit and/or the wind field estimator and/or the power estimator are consequently able to be integrated into the general condition monitoring of the wind turbine. A SCADA system is known, for example, from DE102007026176A1.

The invention further relates to a wind turbine having
an electrical system and a rotor which comprises a plurality of rotor blades and which is driven by wind and outputs a mechanical rotor power to the electrical system which converts it at least partially into an electrical power and
a control device according to the invention. The wind turbine may be developed in accordance with all the configurations described in relation to the control device according to the invention. In particular, the wind turbine comprises a main control system, by means of which the operation of the wind turbine can be controlled. The control device is preferably completely or partially integrated in the main control system.

The rotor is rotated by the wind about a rotor axis. In particular, the rotor is supported for rotation about the rotor axis on a machine carrier of the wind turbine. The machine carrier is preferably securely connected to a gondola and/or forms it or a portion thereof. In particular, the machine carrier is arranged at the upper end of a tower.

According to a development of the invention, the rotor and/or the machine carrier can be rotated about a yaw axis which preferably extends transversely or substantially relative to the rotor axis. Preferably, the yaw axis extends in or substantially in a vertical direction. The rotation of the rotor and/or the machine carrier about the yaw axis is described by a yaw angle, on which particularly the orientation of the rotor axis relative to the wind direction is dependent. The machine carrier is preferably supported on the tower for rotation about the yaw axis.

The rotor preferably comprises two or more, in particular three or at least three, rotor blades which each extend along a blade axis. The blade axes preferably extend transversely or substantially transversely relative to the rotor axis. Furthermore, the rotor preferably comprises a rotor hub, to which the rotor blades are secured. In particular, the rotor blades are each supported on the rotor hub by means of a blade bearing so as to be rotatable about the blade axis thereof, respectively. There is preferably provided for each rotor blade a blade angle adjustment drive, by means of which the rotor blade can be rotated about the blade axis thereof. The rotation of the rotor blades about their blade axes is described by a blade angle on which particularly the angle of incidence of the rotor blade relative to the wind is dependent, respectively.

The electrical system preferably comprises at least one electrical generator which is mechanically connected to the rotor and which is driven thereby. The rotor is connected in a rotationally secure manner, in particular by means of its rotor hub, to a rotor shaft by means of which the rotor is mechanically coupled to the electrical system, in particular the at least one generator. That connection may be carried out with one or more gears being interposed. The electrical system is preferably connected to an electrical network which is preferably an external network. In particular, the electrical system may output the electrical power to the network.

The invention further relates to a method for controlling the operation of a wind turbine which has an electrical system and a rotor which comprises a plurality of rotor blades and which is driven by wind and outputs a mechanical rotor power to the electrical system which converts it at least partially into an electrical power, at least one physical property which is dependent on at least one characteristic variable of a wind field describing the wind at the location of the rotor being measured by at least one of the rotor blades and an estimated value for the electrical power being established using the at least one physical property measured. The method according to the invention is preferably carried out with the control device according to the invention and/or with the wind turbine according to the invention and may be developed in accordance with all the configurations described in this regard.

According to a development of the invention, an estimated value for the mechanical rotor power is established using the at least one physical property measured. Furthermore, in particular the estimated value for the electrical power is established on the basis of the estimated value for the mechanical rotor power. At least one value which characterises the at least one characteristic variable of the wind field and the estimated value for the mechanical rotor power are preferably established using the at least one physical property measured, which estimated value is preferably established on the basis of the at least one value characterising the at least one characteristic variable of the wind field. According to a configuration of the invention, the at least one value characterising the at least one characteristic variable of the wind field is at least one estimated value characterising the at least one characteristic variable of the wind field.

The at least one value characterising the at least one characteristic variable of the wind field and/or the estimated value for the mechanical rotor power is/are established, for example, using a or at least one method for system identification. According to a configuration of the invention, the at least one value characterising the at least one characteristic variable of the wind field and/or the estimated value for the mechanical rotor power is/are established using a or at least one MBC transformation (Multi-Blade Coordinate Transformation). For example, the at least one MBC transformation may comprise a 1p MBC transformation or a 1p MBC transformation and a 2p MBC transformation.

Values which characterise the at least one characteristic variable of the wind field and values for estimating the mechanical rotor power are preferably stored for different wind conditions in a wind field table, the values for estimating the mechanical rotor power particularly being in relation to the values characterising the at least one characteristic variable of the wind field. The estimated value for the mechanical rotor power is preferably established using the wind field table. A value stored in the wind field table is preferably established in order to estimate the mechanical rotor power using the at least one physical property measured. The values stored in the wind field table may, for example, be calculated by model formation and/or established by tests.

The at least one physical property is measured in particular several times one after the other, preferably continuously. A plurality of values are preferably established in succession in order to estimate the mechanical rotor power, the estimated value for the mechanical rotor power being formed with time averaging or by time averaging of those values and consequently representing a mean time value for the estimated mechanical rotor power. The averaging is preferably carried out over a preselected time period. The estimated value for the mechanical rotor power preferably forms a continuous mean time value.

The estimated value for the electrical power is established, for example, using a or at least one method for system identification. Operating values dependent on the mechanical rotor power and power values for estimating the electrical power are preferably stored for different operating conditions of the wind turbine in a power table, the power values for estimating the electrical power preferably being in relation to the operating values dependent on the mechanical rotor power. The estimated value for the electrical power is preferably established using the power table. The values stored in the power table may, for example, be calculated by model formation and/or established by tests.

According to a development of the invention, the estimated value for the electrical power is further established on the basis of the at least one value characterising the at least one characteristic variable of the wind field.

The electrical power is preferably controlled in accordance with at least one desired value for the electrical power. The at least one desired value for the electrical power is preferably requested and particularly comprises a desired value for the effective electrical power and/or a desired value for the reactive electrical power. The estimated value for the electrical power is preferably further established on the basis of the at least one desired value for the electrical power.

According to a configuration of the invention, at least one physical property of the air is measured at the location of the wind turbine. The measurement is preferably carried out at the location of the rotor. The value characterising the at least one characteristic variable of the wind field and/or the estimated value for the mechanical rotor power are preferably further established using the at least one physical property of the air measured. Measuring the at least one physical property of the air particularly includes measuring the air density and/ or the air temperature so that the at least one physical property of the air preferably includes the air density and/or the air temperature.

According to a configuration of the invention, at least one physical property of the rotor is measured. The at least one physical property of the rotor preferably comprises the rotor angle and/or the rotation speed of the rotor and/or the blade angle of the at least one rotor blade and/or the rotor acceleration.

The operating state of the wind turbine is preferably characterised by at least one operating state variable which comprises the at least one physical property of the air and/or the at least one physical property of the rotor. The at least one operating state variable is preferably measured. The at least one operating state variable measured particularly comprises the at least one physical property of the air measured and/or the at least one physical property of the rotor measured.

According to a development of the invention, values for the at least one operating state variable are further stored in the wind field table for different operating states of the wind turbine, the values for estimating the mechanical rotor power preferably further being in relation to the values for the at least one operating state variable. A value stored in the wind field table for estimating the mechanical rotor power is preferably established using the at least one physical property measured and the at least one operating state variable measured.

According to a development of the invention, measuring the at least one physical property of the at least one rotor blade involves measuring an expansion and/or a torsion and/or a flexion of the at least one rotor blade, in particular at least at one predetermined position thereof. Consequently, the at least one physical property of the at least one rotor blade preferably comprises an expansion and/or a torsion and/or a flexion of the at least one rotor blade, in particular at the or at the at least one predetermined position(s).

A current value of the electrical power is preferably measured. In this instance, in particular the difference between and/or the quotient from the estimated value for the electrical power and the current value of the electrical power is/are calculated.

According to a development of the invention, a current value of the mechanical rotor power is measured. In this instance, in particular the difference between and/or the quotient from the estimated value for the mechanical rotor power and the current value of the mechanical rotor power is/are calculated.

BRIEF DESCRIPTION OF DRAWINGS

The invention is described below with reference to preferred embodiments and the drawings, in which.

DETAILED DESCRIPTION

Figure 2:
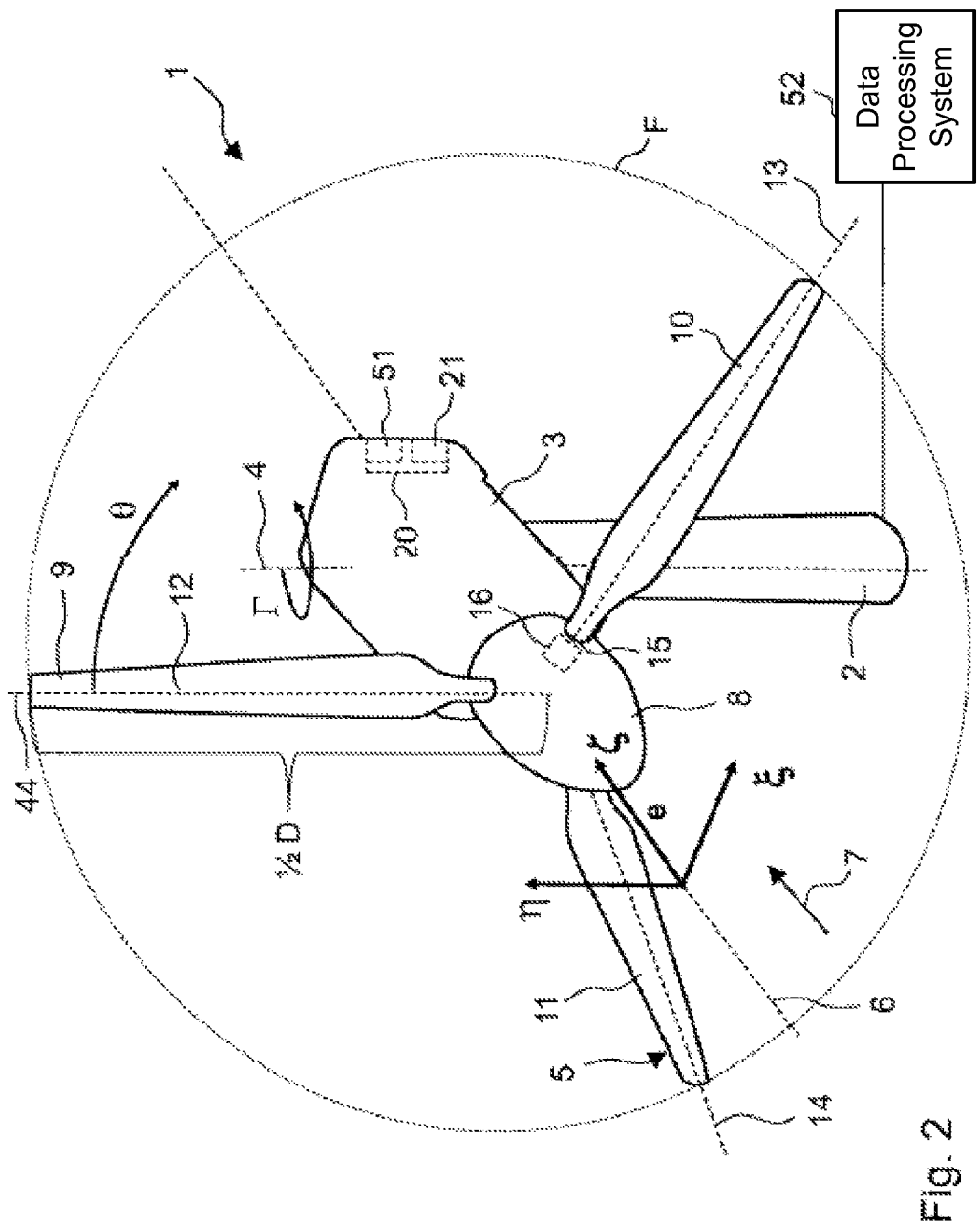
FIG. 2 is a perspective partial view of the wind turbine.
Figure 3:
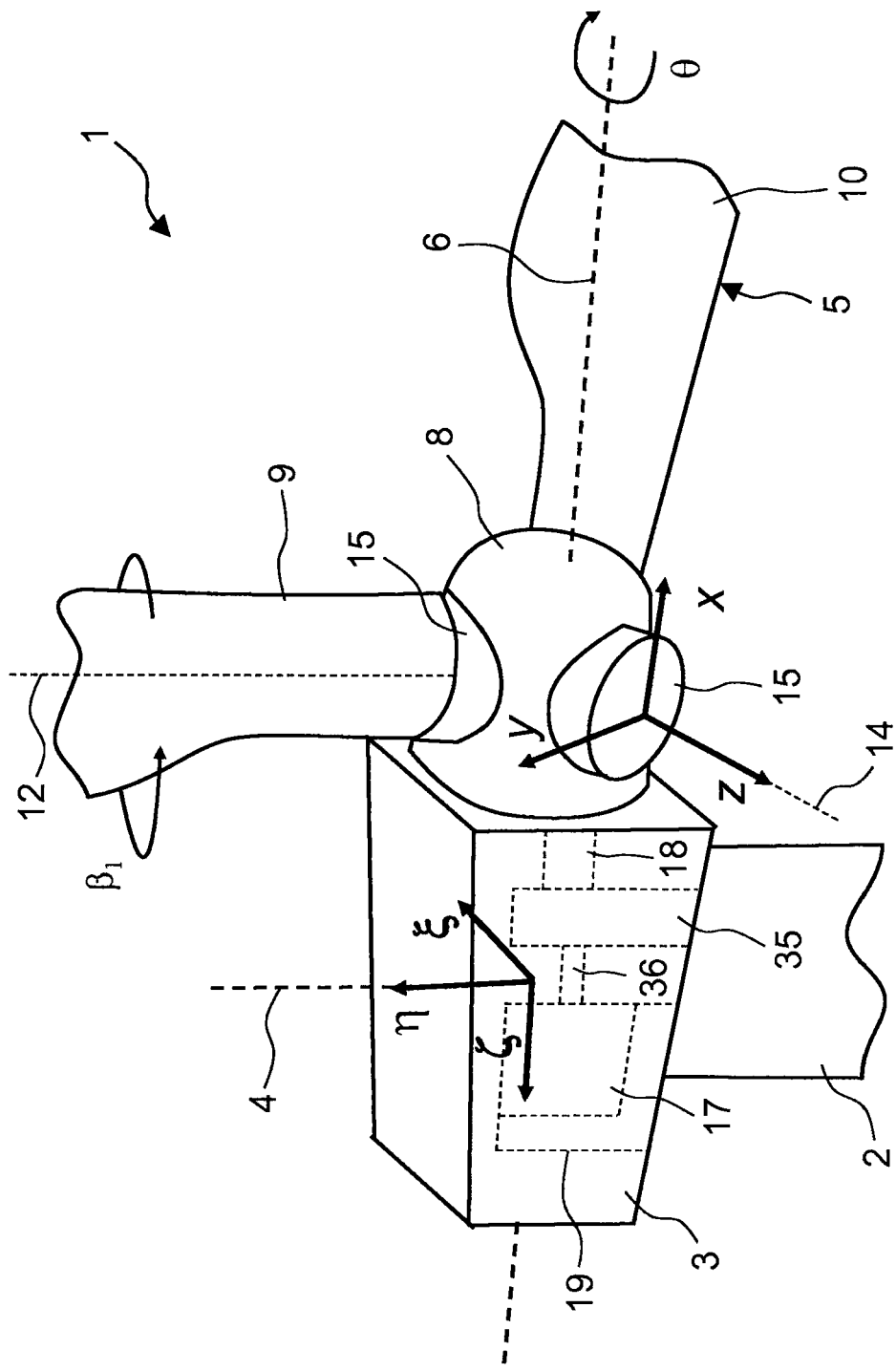
FIG. 3 is a different perspective partial view of the wind turbine.

FIGS. 2 and 3 are various illustrations of a wind turbine 1 according to the invention which comprises a tower 2, on the upper end of which a gondola 3 (machine carrier) is supported so as to be rotatable about a yaw axis 4, the rotation of the gondola 3 about the yaw axis 4 being characterised by the yaw angle $\Gamma$. A rotor 5 is supported on the gondola 3 so as to be rotatable about a rotor axis 6 and is rotated about it by wind 7, the rotation position of the rotor 5 being characterised by a rotor angle $\theta$. The rotor 5 comprises a rotor hub 8, to which three rotor blades 9, 10 and 11 are secured and extend away from the rotor hub 8 along the blade axes 12, 13 and 14 thereof, respectively. The blade axes 12, 13 and 14 each extend transversely relative to the rotor axis 6 and define angles of 120° relative to each other. The rotor blades are supported on the rotor hub 8 by blade bearings 15 so as to be rotatable about the blade axes thereof, the rotation of the rotor blades about the blade axes thereof being characterised by a blade angle $\beta_i$. The index i denotes the rotor blade, i=1 denoting the rotor blade 9, i=2 denoting the rotor blade 10 and i=3 denoting the rotor blade 11. In order to rotate the rotor blades about the blade axes thereof, there are provided blade angle adjustment drives 16 which are preferably arranged in the region of the blade bearings 15. The rotor angle $\theta$ is described by the position of a specific one of the rotor blades, in this instance the rotor blade 9 relative to a reference position 44. According to the momentary incidence of the rotor blade 9 visible in FIG. 2, the rotor angle is consequently $\theta=0$.

An electrical generator 17, which is part of an electrical system 19 of the wind turbine 1 and which is driven by the rotor 5 with a gear 35 being interposed, is arranged in the gondola 3. The rotor 5 is connected via a rotor shaft 18 to the gear 35 which is connected to the generator shaft 36 at the output side. The rotor shaft 18, the gear 35 and the generator shaft 36 consequently form a drive train of the wind turbine 1. The wind turbine 1 is controlled by means of a control unit 20 which is also referred to as the main control system and which comprises an estimation unit 21 for estimating the electrical power P produced by the electrical system 19. The electrical power P is controlled by means of the control unit 20, preferably both with regard to its effective power and with regard to its reactive power. In order to control the electrical power P, the control unit 20 controls the electrical system 19 and the blade angle adjustment drives 16. The main control system 20 further comprises a SCADA system 51, by means of which information can be transmitted to one or more data-processing systems 52 which are connected to the wind turbine 1 and in particular provided externally in respect thereof.

Figure 1:
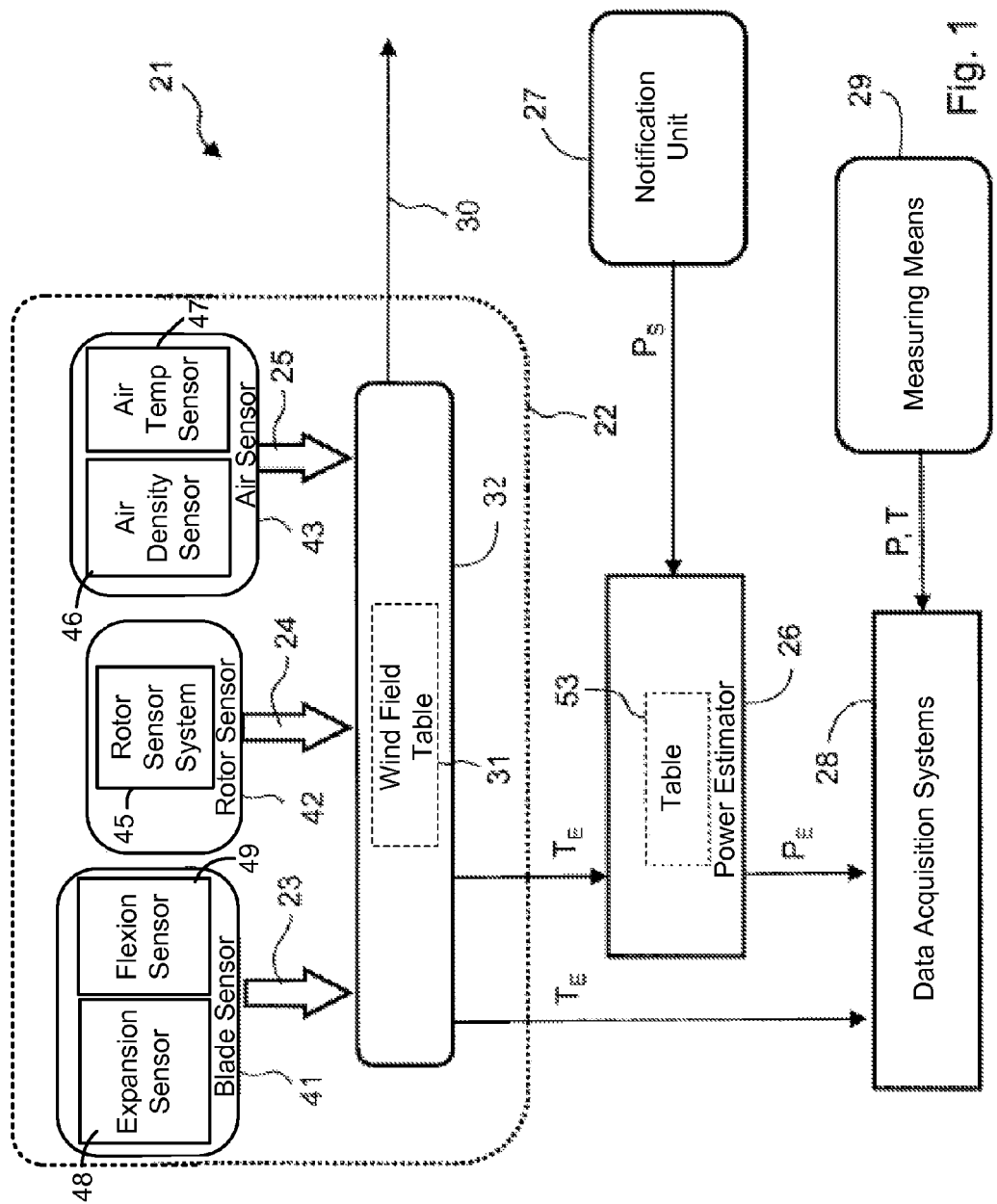
FIG. 1 is a schematic block diagram of an estimation unit of a wind turbine according to the invention.

The estimation unit 21 illustrated in greater detail in FIG. 1 comprises a wind field estimation arrangement 22 having a wind field estimator 32 and a plurality of measuring means 41, 42 and 43 which provide, on the basis of measured physical variables, blade sensor signals 23, rotor sensor signals 24 and atmospheric signals (air sensor signals) 25 and transmit them to the wind field estimator 32. The blade sensor signals 23 characterise physical properties of at least one of the rotor blades, the rotor sensor signals 24 characterise physical properties of the rotor 5 and the air sensor signals 25 characterise physical properties of the atmosphere or the air. The measuring means 41 is also referred to as a blade sensor means, the measuring means 42 also as a rotor sensor means and the measuring means 43 also as an air sensor means.

The estimation unit 21 uses the signals 23, 24 and 25 in order to establish both estimated values for characteristic variables of a wind field and an estimated value $T_E$ for the mechanical rotor power T which is output by the rotor 5 via the rotor shaft 18. The wind field describes the wind 7 in or in the region of the surface-area F covered by the rotor 5. The estimated values are output to a power estimator 26 of the estimation unit 21.

A notification unit 27 of the estimation unit 21 requests, particularly from the control unit 20, the desired value $P_S$ for the electrical power and transmits it to the power estimator 26 which establishes an estimated value $P_E$ for the electrical power on the basis of the desired value $P_S$ and the estimated value $T_E$ for the mechanical rotor power and transmits it to a data acquisition system 28. Furthermore, a measuring means 29 measures, in particular in the electrical system 19, the current value of the electrical power P and transmits it to the data acquisition system 28. Preferably, the measuring means 29 also measures, particularly in the drive train, the current value of the mechanical rotor power T and transmits it to the data acquisition system 28. The data acquisition system 28 collects and/or stores the estimated value $P_E$ for the electrical power and the current value of the electrical power P and calculates the difference between those two values. Consequently, the measuring means 29 preferably has a measuring means for electrical power, by means of which the current value of the electrical power P can be measured, and a measuring means for mechanical power, by means of which the current value of the mechanical rotor power T can be measured. The estimation unit 1 preferably comprises the measuring means 29. The estimation unit 21 may further also comprise the data acquisition system 28.

The characteristic variables of the wind field particularly comprise the wind speed and/or the wind direction and/or the wind shear. The wind direction preferably comprises the wind direction in the horizontal plane and/or the wind direction in the vertical plane. The wind shear preferably comprises the horizontal wind shear and/or the vertical wind shear. Consequently, the characteristic variables of the wind field describe properties of the wind 7 in or in the region of the surface-area F covered by the rotor 5.

The wind field estimator 32 preferably receives and/or collects the following data:
- data of the blade sensor signals 23 (rotor blade data) of at least one or each rotor blade,
- data of the rotor sensor signals 24 (rotor data) which comprise the rotor angle θ and/or the rotation speed Ω of the rotor 5 and/or the blade angle $β_i$ of at least one or each rotor blade and/or preferably also the rotor acceleration dΩ/dt,
- data of the air sensor signals 25 (atmospheric data) which comprise the air density ρ and/or the air temperature $Θ_a$ at the location of the wind turbine 1, particularly in the region of the rotor 5.

The measuring means 42 preferably comprises a rotor sensor system 45, by means of which the rotor angle θ and/or the rotation speed Ω and/or the or the at least one blade angle(s) $β_i$ and/or preferably also the rotor acceleration dΩ/dt can be detected. The measuring means 43 further preferably comprises an air density sensor 46, by means of which the air density ρ can be detected and/or an air temperature sensor 47, by means of which the air temperature $Θ_a$ can be detected.

The estimated values for the characteristic variables of the wind field are established from the signals 23, 24 and 25 or the data thereof. Those estimated values comprise estimated values for the wind speed and/or for the wind direction and/or for the horizontal wind shear and/or for the vertical wind shear. The estimated value $T_E$ is further established for the mechanical rotor power which the rotor 5 outputs to the drive train of the wind turbine 1. Those estimated values are preferably transmitted via an information line 30 to the control unit 20 of the wind turbine 1 and may be used for control purposes. The estimated values are also preferably transmitted to the data acquisition system 28 so that they can be used thereby.

The estimated value $T_E$ for the mechanical rotor power is transmitted to the power estimator 26 which uses this information to calculate the estimated value $P_E$ for the electrical power. This estimated value $P_E$ characterises an electrical power which should be produced by the electrical system 19 if the mechanical rotor power corresponds to the estimated value $T_E$.

According to a configuration, the power estimator 26 calculates the estimated value $P_E$ for the electrical power (at least) on the basis of the given estimated value $T_E$ for the mechanical rotor power using information which is obtained by at least one system identification method. According to another configuration, the power estimator 26 uses a model of the electrical system 19 in order to arrive at the estimated value $P_E$ for the electrical power.

According to a preferred configuration, the estimated value $T_E$ for the mechanical rotor power, the rotation speed Ω of the rotor 5 and the atmospheric temperature (air temperature) $Θ_a$ are time-averaged over a preselected time period (for example, in the form of continuous mean time values) and then transmitted to the power estimator 26. The notification unit 27, by means of which the desired value $P_S$ for the electrical power is requested, further transmits a piece of information concerning the desired value $P_S$, which is currently assigned by the control unit 20, for the electrical power to the power estimator 26, the desired value preferably comprising both the effective power and the reactive power. This information is also time-averaged over a period of time which corresponds or substantially corresponds to the preselected time period over which the mechanical data are averaged or have been averaged. The power estimator 26 uses both the estimated value $T_E$ for the mechanical rotor power and the desired value $P_S$ for the electrical power in order to calculate the estimated value $P_E$ for the electrical power.

According to a configuration, the power estimator 26 uses a table 53 (power table) or an equivalent functional tool to produce relationships in order to store estimated values for the electrical power when the wind turbine 1 is operated under different conditions. For simplification, the stored relations are each established during operation of the wind turbine 1 in the stationary state. However, the stored relations or some of the stored relations may also be established during operation of the wind turbine 1 in the acceleration state and/or in the deceleration state if the additional costs thereby caused are acceptable. The estimated values stored in the table 53 for the electrical power (that is to say, the expected values for the electrical power) are functionally dependent on the stationary mechanical rotor power, the rotor speed, the ambient temperature (preferably air temperature) and the adjustments (preferably desired values) for the effective power and reactive power. According to another configuration, the table 53 is functionally dependent on the following variables: the stationary mechanical rotor power, the rotor speed, the ambient temperature, the adjustments for the effective power and reactive power and the rate of change of the variables mentioned.

According to another configuration, the power estimator 26 uses a model of the electrical system 19 to calculate the estimated value $P_E$ for the electrical power on the basis of exact or approximate control equations or on the basis of models for one or more components of the electrical system 19. It is also possible to have a mixture of calculations based on tables and based on models.

If the electrical system 19 is sensitive to additional measurable parameters such as, for example, the temperature of the generator windings and/or the temperature of the electronic power system, the power estimator 26 is preferably constructed in such a manner that it is further functionally dependent on those additional measurable parameters. During operation of the wind turbine 1, those additional measurable parameters are measured and used by the power estimator 26 to calculate the estimated value $P_E$ for the electrical power.

If the estimated value $P_E$ for the electrical power is established by the power estimator 26, the power estimator 26 transmits a piece of information regarding that estimated value to the data acquisition system 28 which stores and processes the information and optionally transmits it to an end user, such as the wind turbine operator. The piece of information may further be transmitted to the other data-processing systems 52. To that end, the data-acquisition system 28 is connected to the SCADA system 51 and can consequently also be referred to as a SCADA unit. The data acquisition system 28 further receives the estimated value $T_E$ for the mechanical rotor power from the wind field estimator 32. According to the preferred construction, the current value of the mechanical rotor power and the current value of the electrical power are measured by the measuring means 29, information regarding those values being transmitted to the data acquisition system 28. That information may also be referred to as SCADA information. The current mechanical rotor power can be measured, for example, in that the torque transmitted between the gear 35 and the generator 17 is measured. Alternatively, however, the current mechanical rotor power may also be measured at the rotor shaft or at a different location in the drive train. In particular, a torque sensor which is preferably arranged on a shaft in the drive train such as, for example, the rotor shaft or the generator shaft, is used to measure the torque. For example, the torque sensor comprises expansion measurement strips, by means of which the deformation of the shaft or a measurement body arranged thereon can be detected.

A comparison between the estimated value for the electrical power and the current value of the electrical power and a comparison between the estimated value for the mechanical rotor power and the current value of the mechanical rotor power is carried out by means of the data acquisition system 28. These comparisons are preferably also carried out by units which are provided externally with respect to the wind turbine and which can receive the SCADA information.

If the difference between the estimated value for the electrical power and the current value of the electrical power exceeds, in the time average, a predetermined first threshold value, a first signal is preferably transmitted to the end user and indicates a deterioration of the state of the drive train and/or electrical components of the wind turbine. If the difference between the estimated value for the electrical power and the current value of the electrical power exceeds, in the time average, a predetermined second threshold value, a second signal is preferably transmitted to the end user and indicates a great deterioration of the state of the drive train and/or electrical components of the wind turbine or an error in the system. In particular, the second signal is also transmitted to the control unit 20 of the wind turbine 1.

The characteristic variables of the wind field preferably comprise wind speed values of the wind which are averaged spatially over the surface-area covered by the rotor. Since the mean value is formed spatially, time variations of the data are preferably not influenced by that averaging.

With reference to FIG. 2, an orthogonal co-ordinate system which does not rotate with the rotor and which is fixed to the gondola is introduced with the co-ordinates $\xi$, $\eta$ and $\zeta$. The $\zeta$ co-ordinate is directed along the rotor axis 6 and is designated by a unit vector e (letters in bold indicate vectors). The $\eta$ co-ordinate is directed vertically upwards and the $\xi$ co-ordinate is directed in the horizontal direction. A first characteristic variable of the wind field is the mean wind speed $V_m$:

$$V_m(t) = \frac{1}{F} \int \int V(t) dF,$$

F designating the surface-area covered by the rotor, t designating the time and V(t) designating the wind speed at the surface-area F covered by the rotor at the time t. In order to simplify the illustration, the explicit notation "(t)" which denotes the time dependency of variables is omitted.

The mean wind speed $V_m$ comprises components $V_1$, $V_2$ and $V_3$, with $V_1$ being directed in the direction $\xi$, $V_2$ in the direction $\eta$ and $V_3$ in the direction $\zeta$. The wind direction in the horizontal plane and in the vertical plane can be calculated directly from those components:

$$\chi_H = \arctan(V_1/V_3)$$

$$\chi_V = \arctan(V_2/V_3)$$

The angles $x_H$ and $x_V$ denote the deviation of the wind direction from the rotor axis 6. The horizontal angle $x_H$ is also referred to in literature as the "yaw error" and is generally used for control purposes in order to minimise the value thereof. The vertical angle $x_V$ also contains particularly the angle of inclination of the gondola 3 which forms a geometrically fixed value. For example, local features of the terrain at the location of the wind turbine may be taken into consideration by means of the angle of inclination. Generally, the angle of inclination cannot be adjusted during operation of the wind turbine. The same may apply accordingly to the yaw angle $\Gamma$.

A second characteristic variable of the wind field is the first horizontal moment $\psi_1$ of the wind field:

$$\psi_1 = \frac{1}{F} \int \int \frac{V \cdot e - V_3}{V_3} \left(\frac{\xi}{D}\right) dF,$$

where D denotes the rotor diameter $\xi$ and is measured from the rotor axis 6. The variable $\psi_1$ is proportional to the linear wind shear in the horizontal plane and can consequently also be referred to as the horizontal wind shear.

A third characteristic variable of the wind field is the first vertical moment $\phi_1$ of the wind field:

$$\phi_1 = \frac{1}{F} \int \int \frac{V \cdot e - V_3}{V_3} \left(\frac{\eta}{D}\right) dF,$$

where $\eta$ is measured from the rotor axis 6. The variable $\phi_1$ is proportional to the linear wind shear in the vertical plane and can consequently also be referred to as the vertical wind shear.

Moments of a higher order of the wind field constitute additional characteristic variables of the wind field. The second horizontal moment $\psi_2$ is $$\psi_2 = \frac{1}{F}\int\int \frac{V \cdot e - V_3}{V_3}\left(\frac{\xi}{D}\right)^2 dF$$

and the second vertical moment $\phi_2$ is $$\phi_2 = \frac{1}{F}\int\int \frac{V \cdot e - V_3}{V_3}\left(\frac{\eta}{D}\right)^2 dF.$$

The blade sensor means 41 of the wind field estimation arrangement 22 comprises sensors which are preferably secured in, inside, on or, or in some other manner, to the rotor blades or the rotor hub. Those sensors produce the blade sensor signals 23 which are dependent on the characteristic variables of the wind field.

The wind field estimation arrangement 22 uses, particularly using a system identification method, at least one of the blade sensor signals 23 which is dependent on at least one of the characteristic variables of the wind field.

According to the preferred construction, this blade sensor signal is either proportional to the blade expansion or blade flexion of at least one of the rotor blades when measured at a predetermined location along it. Measurements of the air pressure or the air speed at predetermined locations of the blade surface can also be used, but are not preferred because of their susceptibility with respect to contamination and failure. Consequently, the sensor means 41 preferably comprises at least one expansion sensor 48 and/or at least one flexion sensor 49. The blade expansion may be measured, for example, by optical fibres which are mounted on the blade face or embedded therein, by expansion measurement strips fixed to the blade or by expansion measurements at the bolts, by means of which the blade is fixed to the blade bearing. The torsion moment of the blade may be established, for example, by the torque which is applied by the associated blade angle adjustment device 16 in order to keep the blade in a constant blade angle position being measured.

Blade deformation measurements can be carried out, for example, by optical systems which are provided inside the blade. Such optical systems may comprise, for example, cameras installed in the rotor which can detect and evaluate positional deviations of a marking field arranged in the rotor blade brought about by the blade deformation. The blade flexion moments can be derived, for example, from the values obtained by the blade expansion measurements and from the known geometry of the blade. Although measurements are merely described with reference to one rotor blade, the measurements described here may be carried out on a plurality of rotor blades or on each of the rotor blades.

With reference to FIG. 3, an orthogonal co-ordinate system which rotates with the rotor and which is fixed to the blade is introduced with the co-ordinates x, y and z in order to describe the blade sensor signals 23. The x direction extends according to FIG. 3 along the rotor axis 6, the axis z is parallel with the axis of rotation of the blade bearing 15 which coincides with the associated blade axis 14 and the direction y completes the co-ordinate system which forms a right-handed system. Since this is a co-ordinate system fixed to a blade in this instance, it can be rotated together with the blade about the blade axis 14 so that the positions of the co-ordinate axes x and y which can be seen in FIG. 3 may change.

Figure 4:
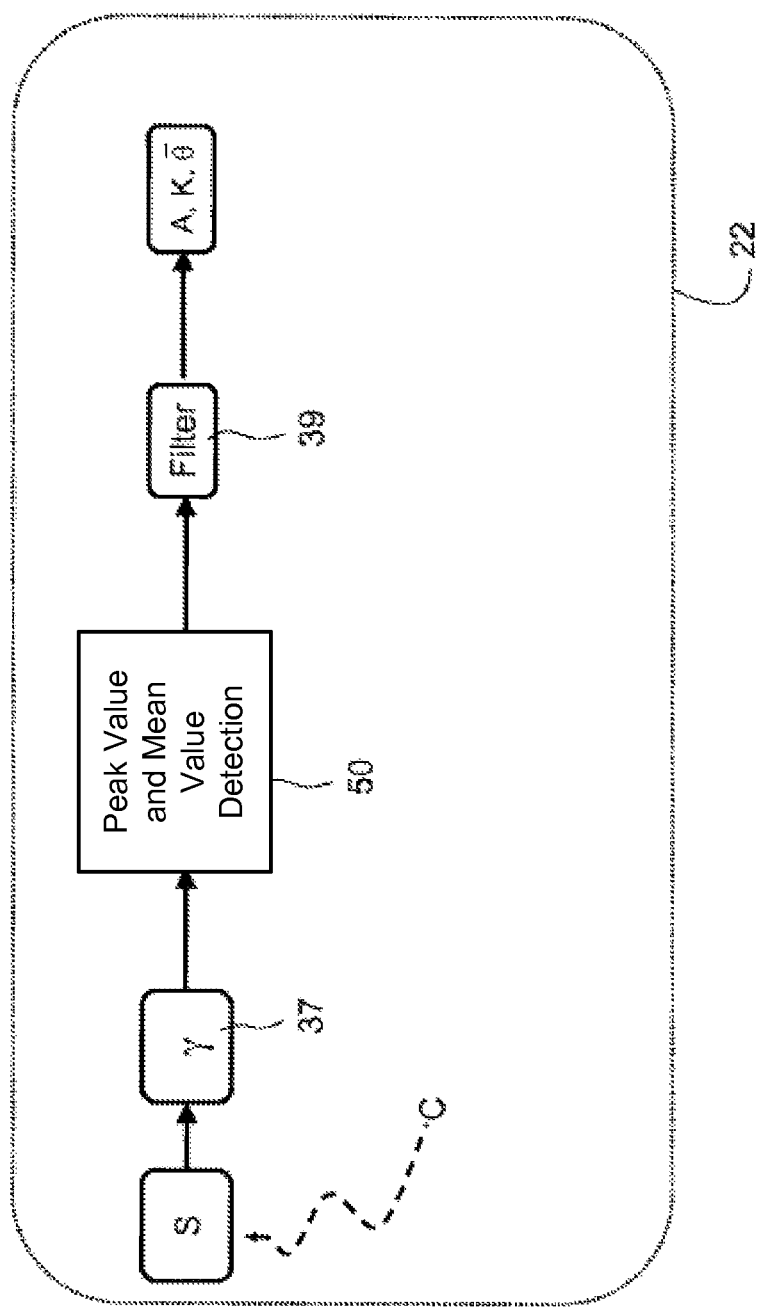
FIG. 4 is a schematic block diagram of a first portion of a wind field estimation arrangement which can be seen from FIG. 1 in accordance with a simple construction.

With reference to FIG. 4, a simple construction of the wind field estimation arrangement 22 is described, with S designating a blade sensor signal from a sensor of the sensor means 41, which sensor is arranged on the rotor hub or on one of the rotor blades and which measures a physical property of the rotor blade, the blade sensor signal S being dependent on at least one characteristic variable of the wind field designated C. In the event of incorrect orientation between the rotor axis 6 and the wind direction or if a wind shear occurs, the rotation of the rotor that is described by the angle θ produces a cyclical variation in the blade sensor signal S which is superimposed on a constant value. In this context, A designates the amplitude of the cyclical variation, $\bar{\theta}$ designates the angle θ at which the maximum or the amplitude occurs and K designates the constant value of the signal. The values of A, K and $\bar{\theta}$ consequently completely characterise the blade sensor signal S in combination. FIG. 4 further illustrates a device for amplification adaptation 37 with an amplification γ (and optionally an offset), a device for detecting a peak value and a mean value 50 and a filter 39. The values of the resultant signals A, K and $\bar{\theta}$ preferably constitute values characterising the at least one characteristic variable C of the wind field.

A table which places the values A, K and $\bar{\theta}$ characterising the blade sensor signal in relation to the value C for the characteristic variable of the wind field is produced in that values for C are recorded via values of the triplet {A, K, $\bar{\theta}$} when the wind turbine 1 is operated under different wind conditions. This operation may be carried out by a precise aeroelastic simulation program for the wind turbine or alternatively by operating the wind turbine in the wind field in combination with independent measuring devices in order to establish the characteristic variables C of the wind field.

According to the preferred construction, a plurality of blade sensor signals are used. The identification of the cyclical and constant components of the signals is carried out by a so-called multi-blade co-ordinate transformation (MBC transformation) which is also referred to alternatively in literature as a Coleman transformation. This transformation is known from the prior art and may be used if the rotor has three or more rotor blades. Although the description of the construction is given with reference to three rotor blades, extension to four or more rotor blades is readily possible for the person skilled in the art.

A distinction is made between two types of MBC transformation: 1) a standard 1p-MBC transformation which provides the following information regarding the signals: the constant components and the amplitudes of the cos(θ) and sin(θ) components; 2) a 2p-MBC transformation of higher order which provides the following information regarding the signals: the amplitudes of the cos(2θ) and sin(2θ) components. In this instance, θ designates (as above) the angle of the rotor 5 about the rotor axis 6, which angle is generally given by the angular position of a specific or marked rotor blade.

Figure 5:
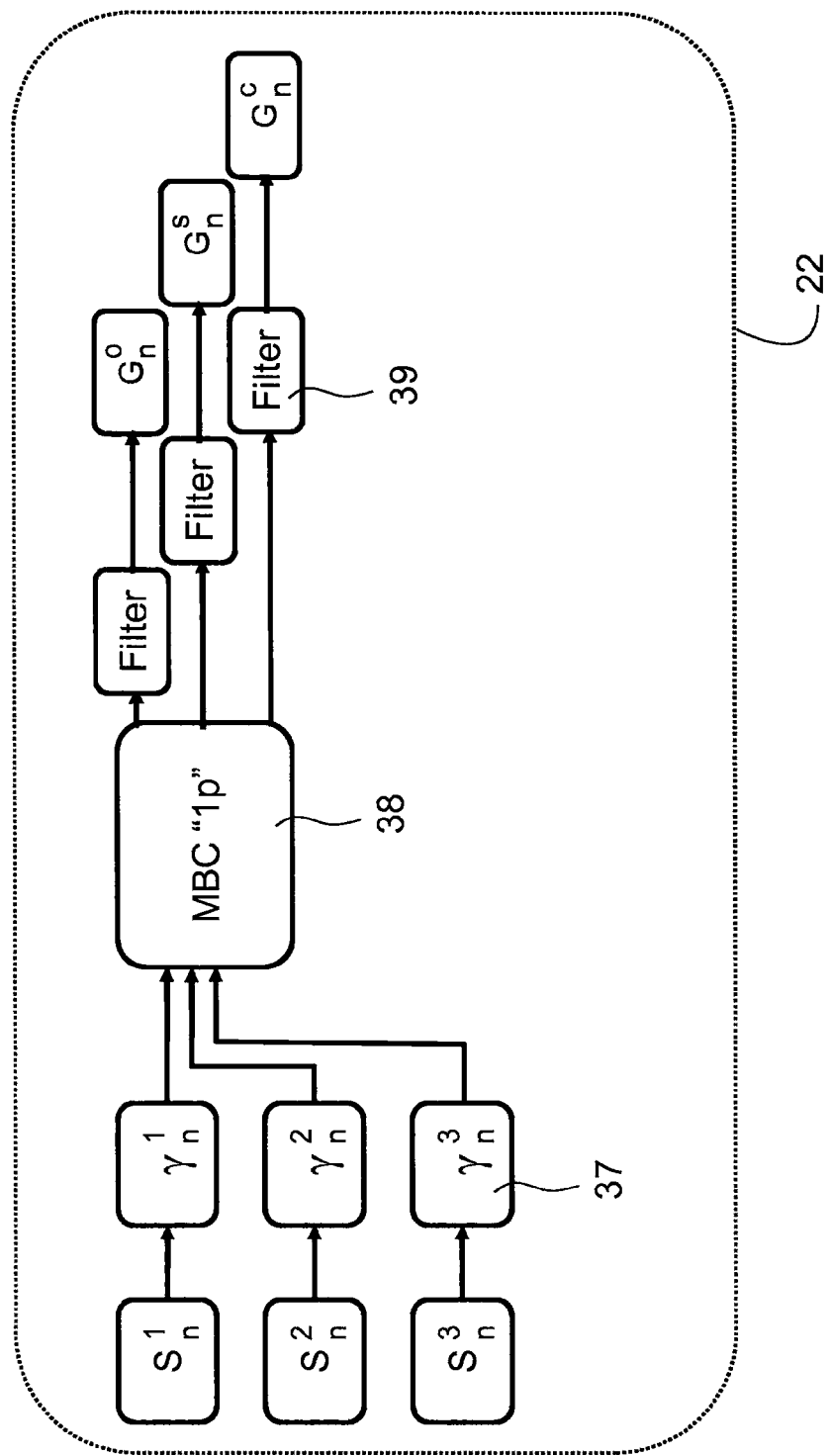
FIG. 5 is a schematic block diagram of the first portion of the wind field estimation arrangement according to a preferred construction.

With reference to FIG. 5, the basis for the 1p-transformation and for the 2p-MBC transformation is a set of signals which comprises three blade sensor signals $\{S_n^1, S_n^2, S_n^3\}$ and which is obtained in that the same type of physical property is measured at each blade. The superscript FIGS. 1, 2 and 3 with S designate the blade number. The index n of S further designates the type of sensor data or the type of physical property (for example, flexion, expansion, twist, etcetera) of the rotor blade, on the basis of which the sensor data are established or have been established. The set of signals is processed as follows:

1. Each blade sensor signal $S_n^i$ passes through a device for amplification adaptation 37 having an amplification $\gamma_n^i$ and an offset (an amplification of one and/or an offset of zero are not excluded). The blade sensor signal is thereby substantially calibrated at any time so that an adapted blade sensor signal is produced.

2. The signal set comprising the adapted blade sensor signals passes through a 1p-MBC transformation 38 so that a stationary signal set is obtained which comprises a constant signal, a signal for the sine amplitude and a signal for the cosine amplitude (the stationary signal set is preferably constructed so as to be comparable with the signal set having the constant, the cyclical amplitude and the angle K, A or $\bar{\theta}$ according to the simple, above-described construction).

3. Aliasing errors are overcome in that the stationary signal set passes through a low-pass filter 39 so that a stationary signal set without aliasing errors is obtained. The low pass filter 39 preferably has a transition frequency which is below three times the rotation frequency of the rotor.

The resultant signals are designated $G_n^O$, $G_n^S$ and $G_n^C$ for the constant component (superscript "O"), for the sine component (superscript "S") and for the cosine component (superscript "C"). The values of the resultant signals $G_n^O$, $G_n^S$ and $G_n^C$ preferably constitute values characterising the at least one or more characteristic variables of the wind field.

In general, any number of signal sets may be used in the wind field estimation arrangement 22, provided that each signal set is "linearly independent" of the other signals sets in the mathematical sense. That is to say that each signal set is not proportional to a linear combination of the other signal sets.

According to a construction, there are used three signal sets which are formed from the blade root flexion moments in the x and y directions which are fixed to blades and from the blade torque in the z co-ordinate which is fixed to a blade. A standard 1p-MBC transformation is used, the characteristic variables of the wind field selected for detection or establishment comprising the mean wind speed $V_m$, the wind directions in the horizontal plane $x_H$ and in the vertical plane $x_V$ and the first moments in ξ and η, that is to say, $\psi_1$ (horizontal wind shear and $\phi_1$ (vertical wind shear). The values obtained by the transformation preferably constitute values characterising the characteristic variables $V_m$, $x_H$, $x_V$, $\psi_1$ and $\phi_1$ of the wind field.

According to another construction, there are used three signal sets which are formed from the blade flexions in the x and y directions fixed to blades and from the twist (for example, distortion or torsion) of the blade in the z coordinate which is fixed to a blade and are measured at predetermined locations along each rotor blade. A standard 1p-MBC transformation is used, the characteristic variables of the wind field selected for detection or establishment comprising the mean wind speed $V_m$, the wind directions in the horizontal plane $x_H$ and in the vertical plane $x_V$ and the first moments in ξ and η, that is to say, $\psi_1$ (horizontal wind shear) and $\phi_1$ (vertical wind shear). The values obtained by the transformation preferably constitute values characterising the characteristic variables $V_m$, $x_H$, $x_V$, $\psi_1$ and $\phi_1$ of the wind field.

Figure 6:
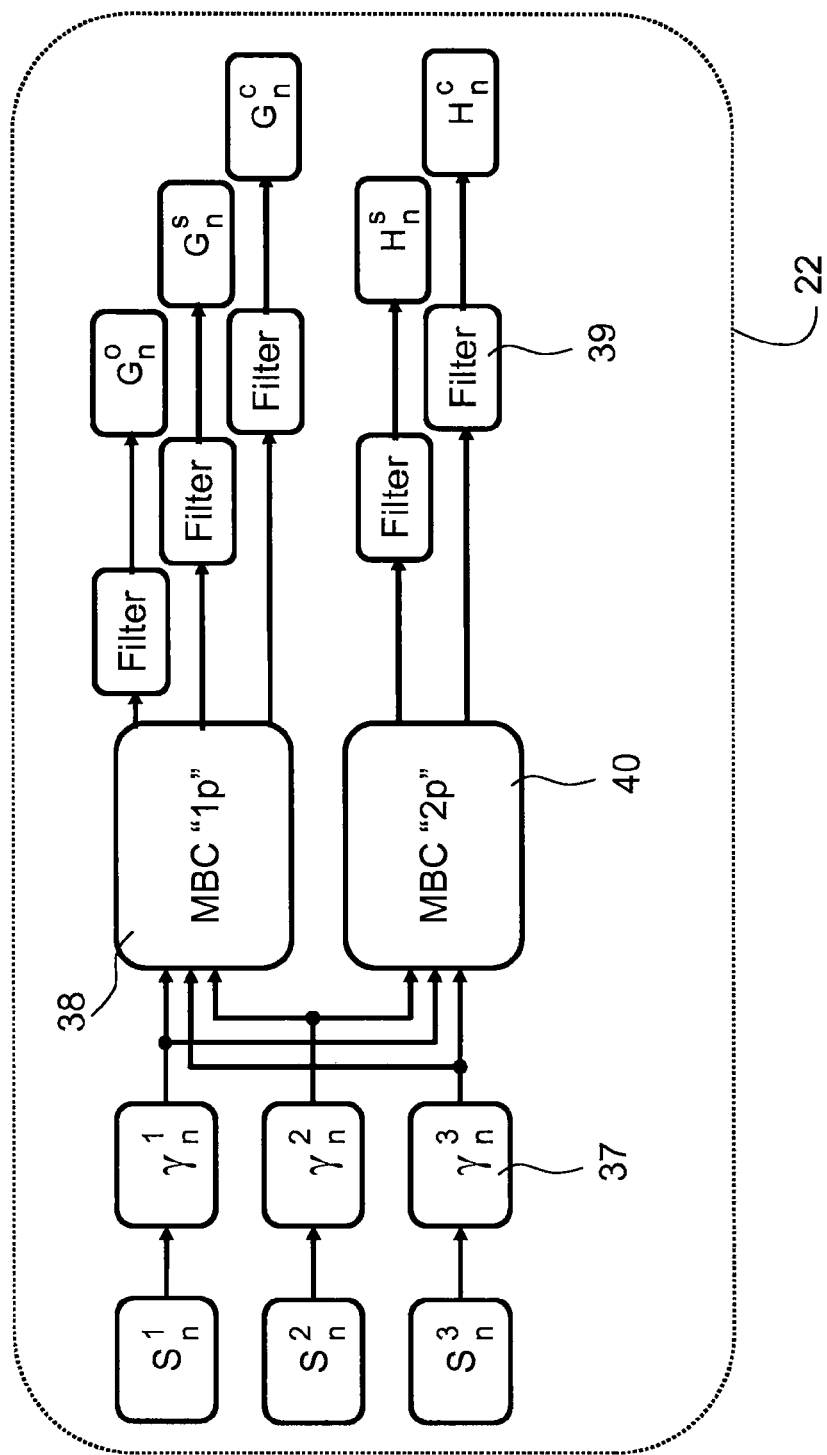
FIG. 6 is a schematic block diagram of the first portion of the wind field estimation arrangement according to another construction.

According to another construction of the invention, there are used three signal sets which are formed from the blade flexions in the x, y and z co-ordinates fixed to blades, the blade flexions being measured at predetermined locations along each blade. According to FIG. 6, both a standard 1p-MBC transformation 38 and a 2p-MBC transformation 40 of higher order are used so that a stationary signal set is obtained without aliasing errors with scalar values. The 1p-MBC transformation provides the values $G_n^O$, $G_n^S$ and $G_n^C$ and the 2p-MBC transformation provides the values $H_n^S$ and $H_n^C$. Consequently, this approach provides a total of 15 scalar values (5 per blade) under each wind condition. The characteristic variables of the wind field selected for detection or establishment comprise the mean wind speed $V_m$, the wind directions in the horizontal plane $x_H$ and in the vertical plane $x_V$ and the first and second moments in ξ and η, that is to say, $\psi_1$, $\phi_1$, $\psi_2$ and $\phi_2$. The values $G_n^O$, $G_n^S$, $G_n^C$, $H_n^S$ and $H_n^C$ obtained by the transformations preferably constitute values characterising the characteristic variables $V_m$, $x_H$, $x_V$, $\psi_1$, $\phi_1$, $\psi_2$ and $\phi_2$ of the wind field.

The wind field estimation arrangement 22 stores the, or the majority of the, values or data which are necessary for estimating the characteristic variables of the wind field and the mechanical rotor power in a table 31 (wind field table). Additional system information, including corrections, may be obtained, for example, by solving the control equations.

$f$ designates a set of variables which are selected to identify the wind field and which preferably comprise or constitute values characterising characteristic variables of the wind field. For example, $f$ may comprise the values A, K and $\bar{\theta}$ according to the simple construction of the wind field estimation arrangement or the values $G_n^O$, $G_n^S$ and $G_n^C$ according to the preferred construction or the values $G_n^O$, $G_n^S$, $G_n^C$, $H_n^S$ and $H_n^C$ according to the additional construction.

For each wind field state which is specified by the states (characteristic values) of the wind field selected for detection or establishment and operating state of the wind turbine which is specified by the rotor speed Ω, the blade angle $\beta_i$, the air density ρ and the temperature $\Theta_a$, the table 31 produces a relation between the values $f$ and at least one value for the mechanical rotor power T. In functional terms, the table 31 represents the functions $$f(V_m, x_H, x_V, \psi_1, \phi_1, \Omega, \rho, \beta_i, \Theta_a)$$

and $$T(V_m, x_H, x_V, \psi_1, \phi_1, \Omega, \rho, \beta_i, \Theta_a).$$

Figure 7:
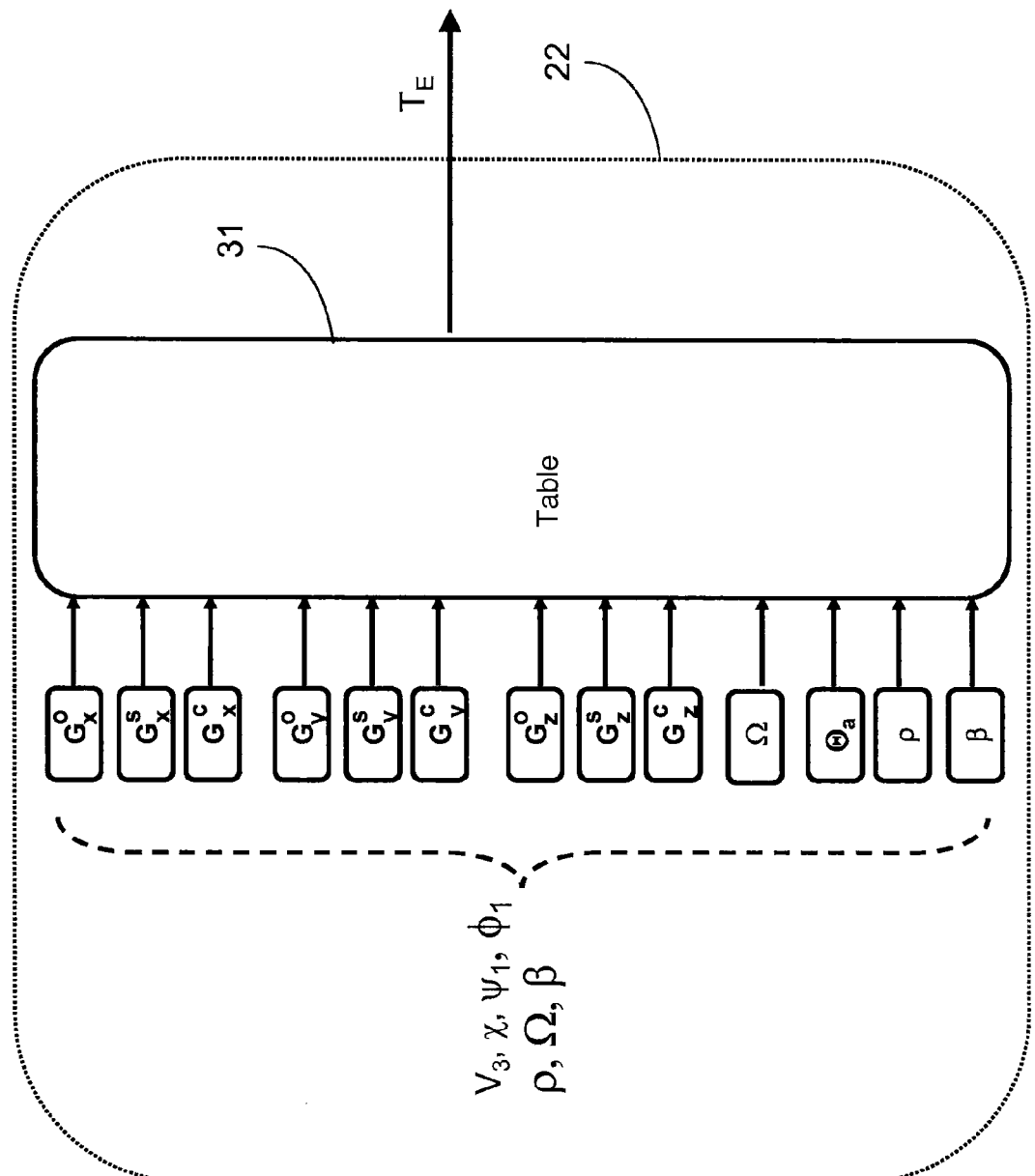
FIG. 7 is a schematic block diagram of a second portion of the wind field estimation arrangement which can be seen from FIG. 1.
Figure 8:
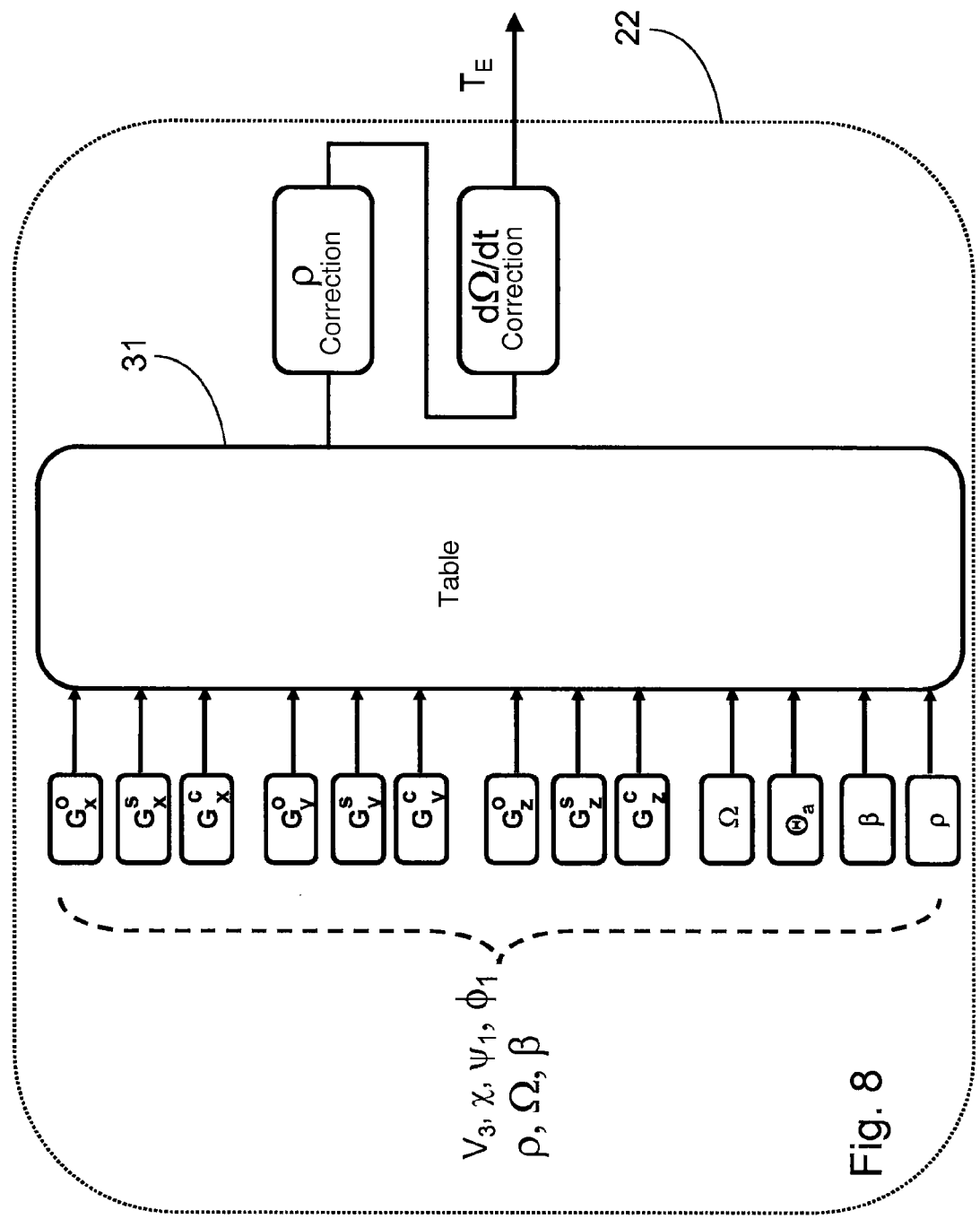
FIG. 8 is a schematic block diagram of the second portion of the wind field estimation arrangement with correction members and FIG. 9 is a schematic block diagram of the second portion of the wind field estimation arrangement with a search unit.

That functional dependence is graphically illustrated in FIGS. 7 and 8. The selected set of wind field states and operating states of the wind turbine is determined by two factors: the first factor comprises the range of values of the values anticipated during the operation of the wind turbine. The second factor comprises the discretisation step which is selected or has been selected to define the value range. The resultant set of states represents a sample of possible wind field and wind turbine states which can be resolved by the wind field estimator 26. According to FIG. 8, there is further carried out a correction of the values established from the table on the basis of the air density ρ and the rotor acceleration dΩ/dt.

If the production of the mechanical rotor power is dependent on additional measurable variables such as, for example, the atmospheric precipitation, this information is added to the set of operating states of the wind turbine.

The table 31 is produced either numerically or by measurements in the wind field. In the numerical approach, a complete wind turbine model is used to simulate the behaviour of the wind turbine under the selected set of wind field states and operating states of the wind turbine. The values of $f$ and the mechanical rotor power or the rotor torque T are calculated and stored in the table 31.

According to the approach according to which measurements are carried out in the wind field, the wind turbine is operated for a sufficient length of time to pass through the selected set of wind field states and operating states of the wind turbine. The operation of the wind turbine in the wind field takes place in combination with independent measuring means in order to establish the characteristic variables of the wind field. The values for ∫ and the mechanical rotor power or the rotor torque T are measured and stored in table 31. It is optionally possible to carry out numerical simulations for a portion of the states in the selected set of wind field states and operating states of the wind turbine and measurements in the wind field for the other portion. Another preferred approach involves the use of measurements in the wind field in order to confirm or correct the table values.

Figure 9:
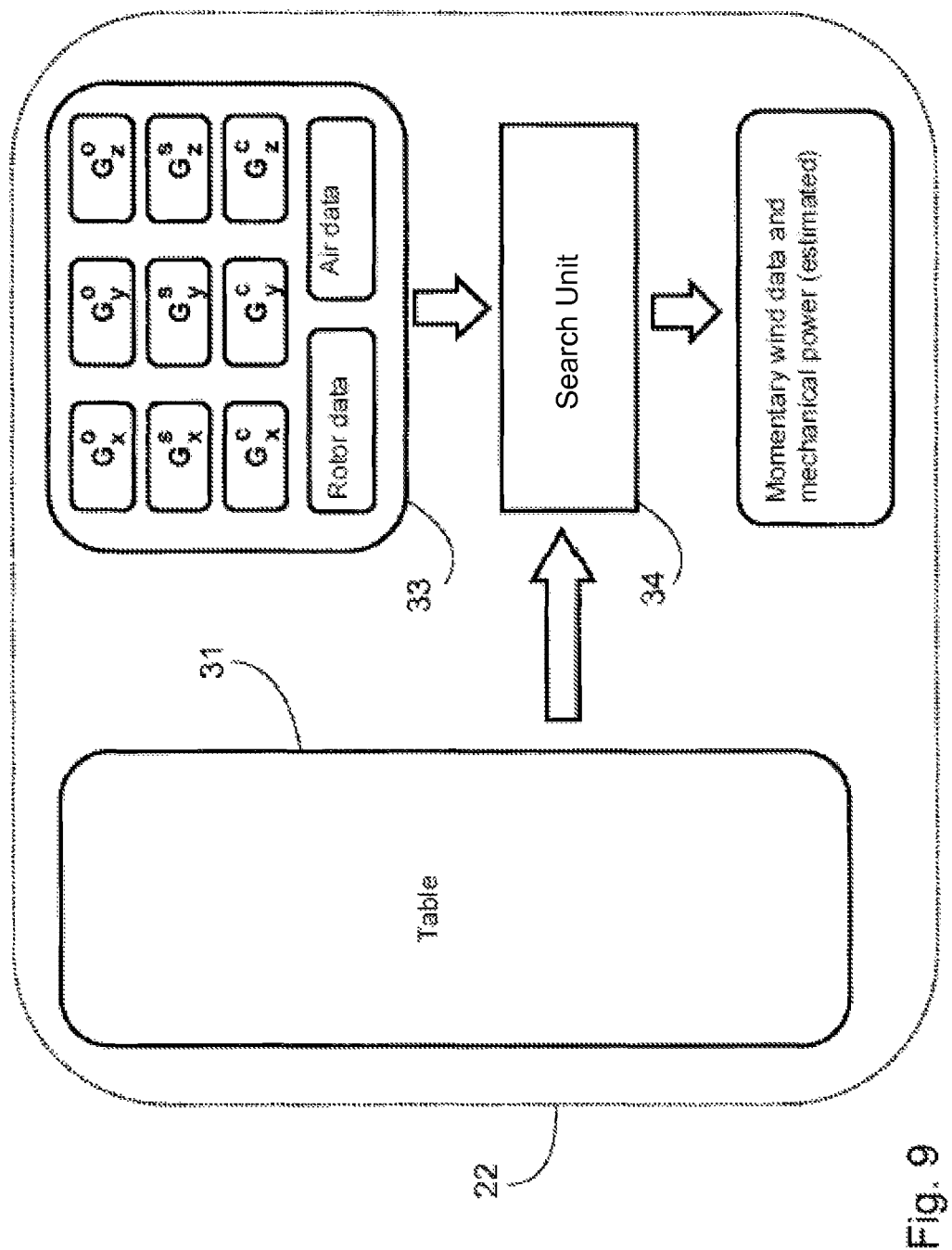

During normal operation of the wind turbine, the measured values 33 which comprise the measured stationary blade sensor signal sets without aliasing errors and the measured rotor data and atmospheric data are, as can be seen in FIG. 9, accessible to a search unit 34 which further has access to table 31. The function of the search unit 34 is to place the measured values 33 in relation to corresponding entries in the table 31. According to a construction, the search unit 34 uses a method of the smallest squares using the positive semi-definite error which is defined as the square of the difference between table values and measured values. The minimum is found by a gradient-based search method. That mathematical method is known from the prior art. According to another construction, the search unit uses a search which is based on binary divisions of table entries in order to find a minimum error. It is also possible to use other algorithms known from the prior art in order to find minimum values of functions.

The values corresponding to the minimum error found by the search unit 33 for the characteristic variables of the wind field comprise the values which are reported by the wind field estimation arrangement 22 and represent estimated values for the characteristic variables of the wind field occurring in the surface-area covered by the rotor and for the mechanical rotor power provided by the rotor 5, and may be used at the time at which the search unit 34 has placed the measured values 33 in relation to the corresponding entries in the table 31. Consequently, the invention allows a relatively precise estimated value to be established for the electrical power which may momentarily be expected.

The invention claimed is:

1. A control device for a wind turbine having a rotor including a plurality of rotor blades configured to be driven by wind and transmitting a mechanical rotor power to an electrical system which at least partially converts the mechanical rotor power into an electrical power, the control device comprising:
    a blade sensor operable to measure at least one physical property at a region of an area covered by at least one of the rotor blades, wherein the at least one physical property is dependent on at least one characteristic variable of a wind field describing the wind at the region, and wherein the blade sensor provides a blade sensor signal characterizing the at least one physical property;
    a rotor sensor means, via which at least one physical property of the rotor is measured and at least one rotor sensor signal which characterises the at least one property of the rotor is provided, the at least one physical property of the rotor comprising the rotor angle θ of the rotor; and
    an estimation unit which establishes an estimated value for the electrical power generated by the wind turbine using the blade sensor signal and the rotor sensor signal.

2. The control device of claim 1, wherein the at least one characteristic variable of the wind field comprises or characterises at least one of a wind speed, a wind direction, a horizontal wind shear or a vertical wind shear.

3. The control device of claim 1, wherein the estimation unit comprises:
    a wind field estimator which establishes an estimated value for the mechanical rotor power using the blade sensor signal and the rotor sensor signal; and
    a power estimator which establishes the estimated value for the electrical power on the basis of the estimated value for the mechanical rotor power.

4. The control device of claim 3, wherein the wind field estimator establishes at least one value which characterises the at least one characteristic variable of the wind field using the blade sensor signal and the rotor sensor signal and establishes the estimated value for the mechanical rotor power on the basis of the at least one value.

5. The control device of claim 3, further comprising at least one wind field table storing values which characterise the at least one characteristic variable of the wind field and values for estimating the mechanical rotor power for different wind conditions, the wind field estimator establishing the estimated value for the mechanical rotor power using the wind field table.

6. The control device of claim 3, wherein an operating state of the wind turbine is characterised by at least one operating state variable which comprises the at least one physical property of the rotor; and
    wherein values for the at least one operating state variable are further stored in the wind field table for different operating states of the wind turbine.

7. The control device of claim 3, further comprising a power table storing operating values and power values dependent on the mechanical rotor power for different operating conditions of the wind turbine in order to estimate the electrical power, wherein the power estimator establishes the estimated value for the electrical power using the power table.

8. The control device of claim 1, wherein the blade sensor comprises an expansion sensor which measures an expansion of the at least one rotor blade, or a flexion sensor which measures a flexion of the at least one rotor blade, wherein the blade sensor is arranged at a predetermined position of the at least one rotor blade.

9. A method for controlling the operation of a wind turbine having an electrical system and a rotor including a plurality of rotor blades configured to be driven by wind to output a mechanical rotor power to an electrical system which at least partially converts the mechanical rotor power into an electrical power, the method comprising:
    measuring at least one physical property at a location of a rotor blade, wherein the physical property is dependent on at least one characteristic variable of a wind field describing the wind at a region of an area covered by the rotor;
    measuring at least one physical property of the rotor, the at least one physical property of the rotor comprising a rotor angle θ of the rotor, and
    determining an estimated value for the electrical power generated by the wind turbine using the measured physical properties.

10. The method of claim 9, wherein the at least one characteristic variable of the wind field comprises at least one of a wind speed, a wind direction, a horizontal wind shear or a vertical wind shear.

11. The method of claim 9, further comprising establishing an estimated value for the mechanical rotor power using the physical properties measured, and establishing the estimated value for the electrical power on the basis of the estimated value for the mechanical rotor power.

12. The method of claim 11, further comprising establishing at least one value which characterizes the characteristic variable of the wind field using the physical properties measured, and establishing the estimated value for the mechanical rotor power on the basis of the at least one value.

13. The method of claim 11, wherein values characterizing the at least one characteristic variable of the wind field and values for estimating the mechanical rotor power for different wind conditions are stored in a wind field table and the estimated value for the mechanical rotor power is established using the wind field table.

14. The method of claim 11, wherein an operating state of the wind turbine is characterised by at least one operating state variable which comprises the at least one physical property of the rotor, and values for the at least one operating state variable are further stored in a wind field table for different operating states of the wind turbine.

15. The method of claim 9, wherein measuring the physical property of the at least one rotor blade comprises measuring an expansion or a flexion of the at least one rotor blade at a predetermined position thereof.

\* \* \* \* \*